(12) United States Patent
Cordiner et al.

(10) Patent No.: US 10,127,750 B2
(45) Date of Patent: Nov. 13, 2018

(54) ELECTRONIC LOCKING SYSTEM

(71) Applicants: Peter Alexander Cordiner, Cape Town (ZA); Kenneth Grant Metcalf, Cape Town (ZA)

(72) Inventors: Peter Alexander Cordiner, Cape Town (ZA); Kenneth Grant Metcalf, Cape Town (ZA)

( * ) Notice: Subject to any disclaimer, the term of this patent is extended or adjusted under 35 U.S.C. 154(b) by 0 days.

(21) Appl. No.: 15/122,637

(22) PCT Filed: Jul. 10, 2015

(86) PCT No.: PCT/IB2015/055229
§ 371 (c)(1),
(2) Date: Aug. 31, 2016

(87) PCT Pub. No.: WO2016/027178
PCT Pub. Date: Feb. 25, 2016

(65) Prior Publication Data
US 2017/0154483 A1   Jun. 1, 2017

(30) Foreign Application Priority Data

Aug. 21, 2014  (ZA) .................................. 2014/06131

(51) Int. Cl.
*G06F 7/04* (2006.01)
*G05B 19/00* (2006.01)
(Continued)

(52) U.S. Cl.
CPC ......... *G07C 9/00309* (2013.01); *G05B 19/00* (2013.01); *G07C 9/00103* (2013.01);
(Continued)

(58) Field of Classification Search
CPC . G07C 5/008; G07C 9/00174; G07C 9/00309
See application file for complete search history.

(56) References Cited

U.S. PATENT DOCUMENTS 8,768,565 B2 * 7/2014 Jefferies ................. G07B 15/00
                                                    701/29.6
9,300,925 B1 * 3/2016 Zhang ..................... H04N 7/181
(Continued)

FOREIGN PATENT DOCUMENTS

JP          2003148017 A       5/2003

OTHER PUBLICATIONS

European Search Report for Application No. 15832988.8-1953/3120334, PCT/IB2015055229, dated Nov. 3, 2017, 9 pages.

*Primary Examiner* — Carlos E Garcia
(74) *Attorney, Agent, or Firm* — Osha Liang LLP

(57) ABSTRACT

A system and method for enabling opening of an electronic locking device (12) from a remote location is disclosed. A remotely accessible server (14) receives an opening request to open an electronic locking device (12) which secures a closing member (18). The opening request includes a unique identifier of the electronic locking device (12) and personal identification information of a mobile communications device (28) requesting to open the electronic locking device (12). The server (14) then determines, based on predefined parameters, whether the mobile communications device (28) is permitted to open the electronic locking device (12). If the server (14) determines that the mobile communications device (28) is permitted to open the electronic locking device (12), then it transmits an opening instruction to the electronic locking device (12) to unlock the closing member (18). In an embodiment, the predefined parameters include a proximity range of the mobile communications device (28) to the electronic locking device (12).

25 Claims, 7 Drawing Sheets

(51) Int. Cl.
    *G07C 9/00*    (2006.01)
    *H04W 12/08*   (2009.01)
    *H04W 4/021*   (2018.01)

(52) U.S. Cl.
    CPC ........ *G07C 9/00571* (2013.01); *H04W 12/08*
    (2013.01); *G07C 9/0069* (2013.01); *G07C*
    *2009/00769* (2013.01); *G07C 2209/63*
    (2013.01); *H04W 4/021* (2013.01)

(56)         References Cited

U.S. PATENT DOCUMENTS

| | | | | |
|---|---|---|---|---|
| 9,721,406 | B2* | 8/2017 | Isaacson | ............ G07C 9/00103 |
| 2002/0070273 | A1 | 6/2002 | Fujll | |
| 2005/0066179 | A1* | 3/2005 | Seidlein | ................ G06Q 20/32 |
| | | | | 713/182 |
| 2006/0170533 | A1* | 8/2006 | Chioiu | ............... G07C 9/00103 |
| | | | | 340/5.61 |
| 2009/0027159 | A1 | 1/2009 | Bozionek et al. | |
| 2011/0311052 | A1 | 12/2011 | Myers et al. | |
| 2012/0213362 | A1* | 8/2012 | Bliding | .............. G07C 9/00309 |
| | | | | 380/44 |
| 2012/0280783 | A1 | 11/2012 | Gerhardt et al. | |
| 2013/0176107 | A1 | 7/2013 | Dumas et al. | |
| 2014/0002236 | A1* | 1/2014 | Pineau | .................... G06F 21/32 |
| | | | | 340/5.6 |
| 2014/0169564 | A1* | 6/2014 | Gautama | ............. G07C 9/00309 |
| | | | | 380/270 |
| 2015/0145647 | A1* | 5/2015 | Engel-Dahan | ..... G07C 9/00571 |
| | | | | 340/5.61 |
| 2016/0284148 | A1* | 9/2016 | Almomani | ......... G07C 9/00309 |
| 2016/0358391 | A1* | 12/2016 | Drako | ................. G07C 9/00103 |
| 2018/0108192 | A1* | 4/2018 | Ho | ..................... G06K 9/00288 |

\* cited by examiner

ELECTRONIC LOCKING SYSTEM

CROSS-REFERENCE(S) TO RELATED APPLICATIONS

This application claims priority to South African provisional patent application number 2014/06131 filed on 21 Aug. 2014, which is incorporated by reference herein.

TECHNICAL FIELD

This disclosure relates to a security system and, more particularly, it relates to electronic locks which communicate with a central controller to remotely manage access thereto.

TECHNICAL BACKGROUND

The use of electronic door locks and locking systems has significantly increased over the last few years. Electronic locks not only provide enhanced security over existing locks, but also provide the convenience of permitting additional access keys, such as access cards or personal information number (PIN) type keys, to be added and removed without having to configure the lock cylinder, or to preform transaction logging, for example storing in the lock's memory the exact date and time when the lock was opened or closed, and the like.

Electronic locks, although being used for various purposes around the world, have found particular favour in the financial industry. In this regard, many banks utilise electronic locks for their automated teller machines (ATM) or vaults. It is estimated that approximately 2.2 million ATMs are currently in use, each of which generally carries a number of removable cassettes in which money or other valuables such as tickets or vouchers are stored. For obvious reasons, these cassettes need to be replenished from time to time, which is generally done at fixed intervals based on the expected usage of the machine. In order to enable the replenishment of the cassettes, ATMs are generally installed at premises which provide a secure method of accessing the ATM, for example through a security door provided at a back entrance of a room or cubicle in which the ATM has been installed.

Both the security doors as well as doors which enable access to the cassettes may be provided with locks, which may generally be opened by means of keys, or electronic solutions such as access cards, personal identification number (PIN) entry devices or fingerprint readers. A drawback typically associated with the use of physical keys is that a person responsible for replenishing an ATM needs to replenish several ATMs per day, thus often resulting in the person having to carry a large number of keys. This not only creates an inconvenience as the person needs to remember which keys fit into which door, but also poses an inherent security risk as the keys may be lost or stolen.

Furthermore, although the electronic solutions are not subject to the same drawbacks often associated with physical keys, at least part of an electronic solution, such as the PIN entry device or the access card reader, are invariably located externally of the room or cubicle and are thus often subject to vandalism, which may render them unusable.

SUMMARY

In accordance with a first aspect of the technology, there is provided a method for enabling opening of an electronic locking device from a remote location, the method being carried out at a remotely accessible server and including the steps of:
- receiving an opening request to open an electronic locking device which secures a closing member, the opening request including a unique identifier of the electronic locking device and personal identification information of a mobile communications device requesting to open the electronic locking device;
- determining, based on predefined parameters, whether the mobile communications device is permitted to open the electronic locking device; and
- in response to determining that the mobile communications device is permitted to open the electronic locking device, transmitting an opening instruction to the electronic locking device to unlock the closing member.

Further features provide for the step of determining, based on predefined parameters, whether the mobile communications device is permitted to open the electronic locking device to include receiving location information of the mobile communications device and, wherein the predefined parameters include a proximity range of the location information of the mobile communications device to a geographical location of the electronic locking device.

Still further features provide for the location information of the mobile communications device to be included in the opening request or to be received in a location detection notification in response to the server transmitting a location detection request; and for the geographical location of the electronic locking device to be obtained by one of the group of: retrieving a stored geographical location referenced by the unique identifier of the electronic locking device from a system database, receiving the geographical location in the opening request, or requesting the geographical location from the electronic locking device.

Yet further features provide for the unique identifier to include a string of characters assigned to the electronic locking device and geographical location data of the opening member to which the electronic locking device has been secured; alternatively, in the event that the unique identifier does not include geographic location data of the electronic locking device, for the method to include the steps of, in response to receiving the opening request: transmitting a location detection request to the electronic locking device prompting the electronic locking device to determine its geographic location, and receiving a location detection notification which includes the geographic location data of the electronic locking device.

Further features provide for the method to include the steps of, in response to receiving the opening request: transmitting a location information request to the mobile communications device prompting the mobile communications device to determine its location, and receiving a location information notification from the mobile communications device which includes the location information of the mobile communications device.

Further features provide for the remotely accessible server to be configured to perform secondary location verification and for the step of determining, based on predefined parameters, whether the mobile communications device is permitted to open the electronic locking device to include the steps of: retrieving information relating to a secondary verification device from a system database, receiving a location verification notification from the secondary verification device which includes the location data of the secondary verification device, and wherein the predefined parameters include a proximity range of the location data of the secondary verification device to an expected location; and for the method to include the step of transmitting a location determination request to the secondary verification device prompting the device to determine its location.

Still further features provide for the expected location to be one or more of: a fixed designated location, a street address, a location in close proximity to the geographic location of the electronic locking device, the location of the mobile communications device and the like.

Yet further features provide for the electronic locking device, the mobile communications device and the secondary verification device to include one or more location detection systems to enable the devices to determine their respective locations; and for the one or more location detection systems to include any one of a Global Positioning System (GPS), a Local Positioning System (LPS), a Wireless Positioning System (WPS) and the like.

Further features provide for the personal identification information to include a mobile device identifier associated with the mobile communications device and a personal identifier of the user of the mobile communications device; for the mobile device identifier to include any one of an international mobile subscriber identity (IMSI), a mobile identification number (MIN), a mobile subscription identification number (MSIN) and the like; and for the personal identifier to include any one of a personal identification number (PIN), a password, a biometric identifier, an authentication image, a passphrase, confirmation that a particular sequence of buttons or movements have been entered on the mobile communications device and the like.

Still further features provide for a plurality of mobile device identifiers and a plurality of personal identifiers to be stored on a system database and for the step of determining, based on predefined parameters, whether the mobile communications device is permitted to open the electronic locking device, to include the steps of: comparing the received personal identification information with the plurality of mobile identifiers and the plurality of personal identifiers stored on the system database and, wherein the predefined parameters include an identifier match of the received personal identification information and the stored mobile identifiers and the stored personal identifiers; and for the remotely accessible server to be configured to transmit, in the event that the received personal identification information does not match the stored mobile identifiers and the stored personal identifiers, a security alert notification to one or more electronic devices that an unauthorised mobile communications device is requesting to open the electronic locking device.

In accordance with a second aspect of the technology there is provided an electronic door locking system comprising a remotely accessible server including:
an opening request receiving module for receiving an opening request to open an electronic locking device which secures a closing member, the opening request including a unique identifier of the electronic locking device and personal identification information of a mobile communications device requesting to open the electronic locking device;
an opening determination module for determining, based on predefined parameters, whether the mobile communications device is permitted to open the electronic locking device; and
an opening instruction transmitting module for transmitting an opening instruction to the electronic locking device to unlock the closing member in response to determining that the mobile communications device is permitted to open the electronic locking device.

Further features provide for the system to include one or more electronic locking devices each of which secures a closing member and is capable of communicating with the remotely accessible server over a communications network.

Still further features provide for the remotely accessible server to be configured to perform location verification and to include a location information receiving module for receiving location information of the mobile communications device, a location comparing module for comparing the location information of the mobile communications device with a geographical location of the electronic locking device and, wherein the predefined parameters include a proximity range of the location information of the mobile communications device and the geographical location of the electronic locking device.

Yet further features provide for the remotely accessible server to include a location detection request transmitting module and to receive the location information of the mobile communications device in a location detection notification in response to transmitting a location detection request to the mobile communications device.

Still further features provide for the remotely accessible server to include one or more of: a geographical location retrieving module for retrieving a stored geographical location referenced by the unique identifier of the electronic locking device from a system database or a geographical location receiving module for receiving the geographical location in the opening request or in response to transmitting a location detection request by means of a location detection request transmitting module.

Yet further features provide for the remotely accessible server to include a location information notification receiving module for receiving a location information notification from the mobile communications device which includes the location information of the mobile communications device.

Still further features provide for the remotely accessible server to be configured to perform secondary location verification and to include a secondary verification device retrieving module for retrieving information relating to a secondary verification device from a system database, a secondary verification location determination request transmitting module for transmitting a location determination request to the secondary verification device prompting the device to determine its location, a secondary verification location notification receiving module for receiving a location verification notification from the secondary verification device which includes the location data of the secondary verification device, a secondary location verification comparing module for comparing the location data of the secondary verification device to an expected location and, wherein the predefined parameters include a proximity range of the location data of the secondary verification device to the expected location.

Yet further features provide for a plurality of mobile device identifiers and a plurality of personal identifiers to be stored on a system database and for the remotely accessible server to include an identifier comparing module for comparing the received personal identification information with the plurality of mobile identifiers and the plurality of personal identifiers stored on the system database and, wherein the predefined parameters include an identifier match of the received personal identification information and the stored mobile identifiers and the stored personal identifiers; and for the remotely accessible server to include a security alert notification transmitting module for transmitting a security alert notification to one or more electronic devices in the event that the received personal identification information does not match any of the stored mobile identifiers and the stored personal identifiers.

In accordance with a third aspect of the technology, there is provided an electronic locking device capable of securing a closing member and comprising a lock and a communications module, the lock being capable of unlocking the closing member based on instructions received from the communications module, the communications module being capable of communicating with a remotely accessible server and being configured to:

receive a lock opening request from a mobile communications device, the lock opening request including personal identification information of the mobile communications device;

transmit an opening request to the remotely accessible server, the opening request including a unique identifier of the electronic locking device and the personal identification information of the mobile communications device; and if the mobile communications device is permitted to open the electronic locking device, receive an opening instruction from the remotely accessible server to unlock the closing member and instruct the lock to unlock the closing member.

In an embodiment, the electronic locking device is capable of communicating with the remotely accessible server over a communications network; and for the communications network to include a wired communications channel or a wireless communications channel, including one or more of third generation (3G), fourth generation (4G), high-speed downlink packet access (HSDPA), general packet radio service (GPRS), short message service (SMS) or unstructured supplementary service data (USSD) communication protocols.

In an embodiment, the electronic locking device utilizes the mobile communications device to communicate with the remotely accessible server. In this embodiment the electronic locking device transmits the opening request to the mobile communications device which then transmits the opening request to the server. If the mobile communications device is permitted to open the electronic locking device, the remotely accessible server then transmits the opening instruction to the mobile communications device which then transmits the opening instruction to the electronic locking device.

In accordance with a fourth aspect of the technology there is provided a computer program product for enabling opening of an electronic locking device from a remote location, the computer program product comprising a non-transitory computer-readable medium having stored computer-readable program code, the computer-readable program code executable by a processing circuit to perform the steps of:

receiving an opening request to open an electronic locking device which secures a closing member, the opening request including a unique identifier of the electronic locking device and personal identification information of a mobile communications device requesting to open the electronic locking device;

determining, based on predefined parameters, whether the mobile communications device is permitted to open the electronic locking device; and in response to determining that the mobile communications device is permitted to open the electronic locking device, transmitting an opening instruction to the electronic locking device to unlock the closing member.

Further features provide for the computer-readable medium to be a non-transitory computer-readable medium and for the computer-readable program code to be executable by a processing circuit.

BRIEF DESCRIPTION OF THE DRAWINGS

The technology will now be described, by way of example only with reference to the accompanying representations in which.

DETAILED DESCRIPTION WITH REFERENCE TO THE DRAWINGS

Embodiments described herein provide a method and system for enabling opening of an electronic locking device from a remote location. The electronic locking device may be used to secure any suitable closing means, including a door of a premises, a door of a vehicle, a lid or other closure of a container, a fuel tank cap and the like. Embodiments of the method and system described may be used to open an electronic locking device and therefore enable opening of the closing member by determining whether certain predefined parameters have been complied with prior to transmitting an opening instruction to the electronic locking device. The predefined parameters may include any number of suitable parameters, including that a user requesting to open the electronic locking device is permitted to request opening of the device, that the user is in close proximity to the device, that the opening request is transmitted at a time when the device may or should be opened and the like.

Embodiments of the method and system disclosed herein may provide a number of advantages over known methods and systems. For example, no physical keys or access cards are required to open the electronic locking device and thus the closing member. In addition, additional security measures, such as determining the location of a secondary verification device, for example the vehicle or other device, are located at an expected location so as to ensure that it is in fact the authorised user requesting opening of the electronic locking device. These and other aspects will become more apparent from the examples described below.

Figure 1:
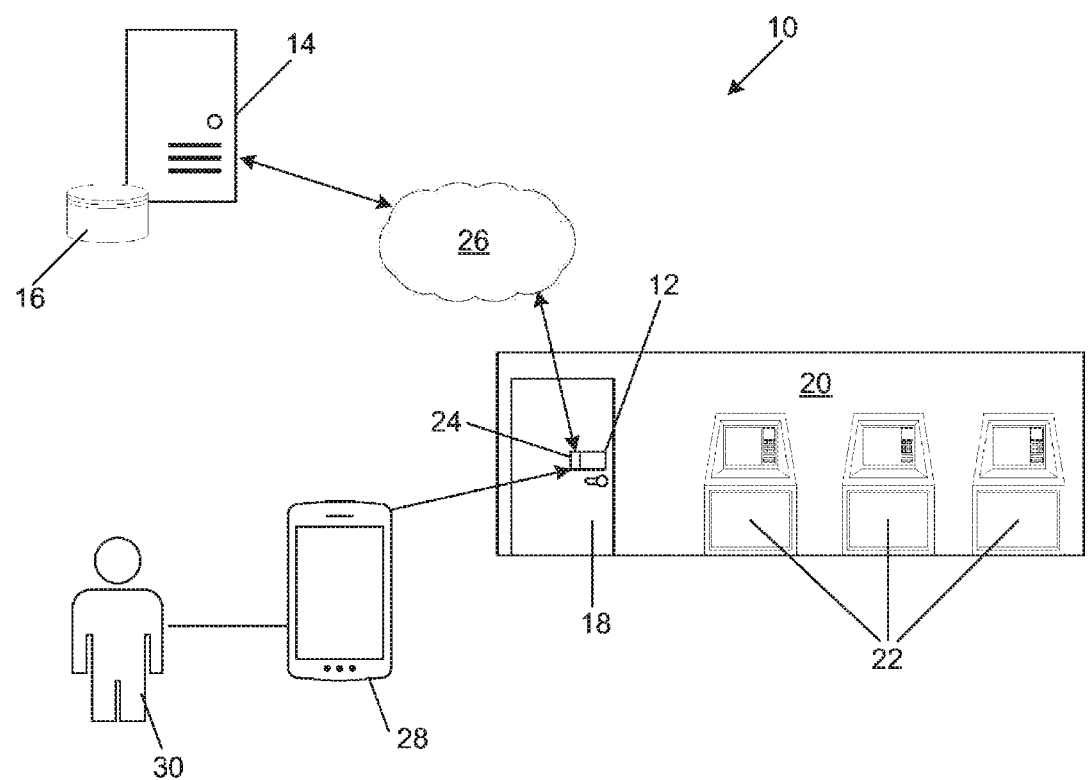
FIG. 1 illustrates a system for enabling opening of an electronic locking device from a remote location according to an embodiment.

FIG. 1 illustrates an embodiment of a system (10) for enabling opening of an electronic locking device (12) from a remote location. The system (10) includes a remotely accessible server (14) in data communication with a system database (16) and a plurality of electronic locking devices (12) each of which secures a closing member (18). For clarity purposes, only one electronic locking device (12) is illustrated in FIG. 1 and in this embodiment the closing member (18) is a door of an entrance to a cubicle (20) in which a number of automated teller machines (ATM) (22) have been installed. The electronic locking device (12) may be secured to the door (18) at any suitable location, preferably within the door (18) itself, or to a surface of the door (18) that is located within the cubicle (20) so as to protect the device (12) from vandalism or other criminal activity. Again, for clarity purposes, the device (12) illustrated in FIG. 1 is visible, and it will be appreciated that in practice the device (12) will not be visible from outside the cubicle (20).

Each electronic locking device (12) has a unique identifier associated therewith and which is stored on the system database (16). The unique identifier comprises a string of characters assigned to the electronic locking device (12), for example the street name and number at which the device (12) has been installed, and geographic location data, such as latitude and longitude coordinates, of the door (18) to which the device (12) has been secured.

The electronic locking device (12) further includes a communications module (24) to enable it to communicate with the remotely accessible server (14) over a communications network (26). Communication between the communications module (24) and the server (14) may take place over a wireless communications network (26), such as third generation (3G), fourth generation (4G), high-speed downlink packet access (HSDPA), general packet radio service (GPRS), short message service (SMS) or unstructured supplementary service data (USSD) communication protocols, but may also be over a wired communications network.

The communications module (24) may be further enabled to wirelessly communicate with a mobile communications device (28) of a user (30) who intends to open the door (18). The mobile communications device (28) illustrated in FIG. 1 is a mobile phone, however, any mobile communications device capable of wireless communication, such as a tablet computer, a laptop computer, a personal digital assistant or a dedicated mobile communications device may be used. Wireless communication between the electronic locking device (12) and the mobile communications device (28) may take place over a local wireless network, near-field communication (NFC), Bluetooth, infrared, 3G, 4G, HSDPA or the like.

Figure 2:
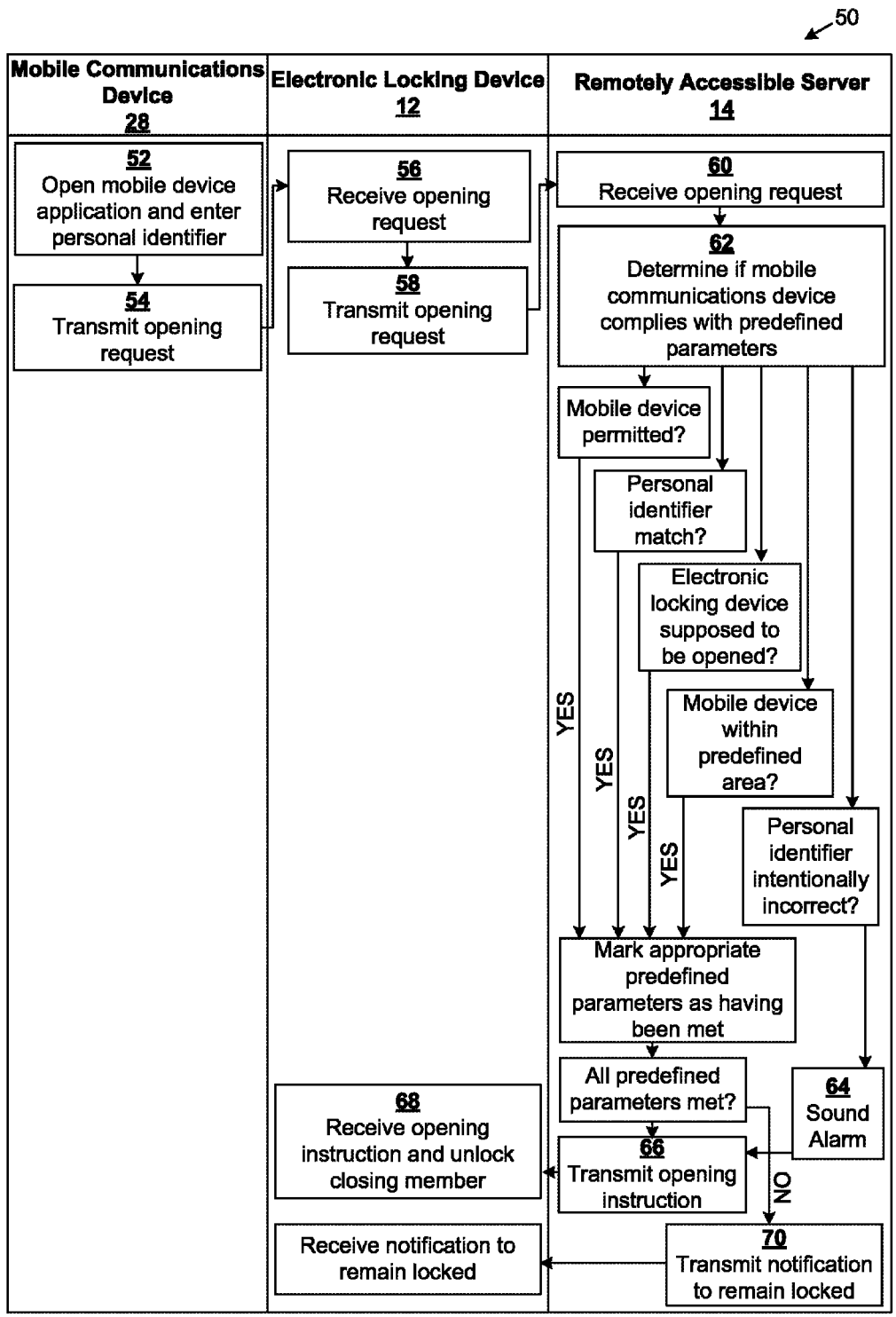
FIG. 2 is a swim-lane flow diagram illustrating a method for opening an electronic locking device from a remote location using the system of FIG. 1.

The system (10) of FIG. 1 may be used according to the method described and illustrated in the embodiment of the swim lane diagram (50) of FIG. 2.

Referring to FIG. 2, an embodiment of a method for opening an electronic locking device from a remote location is described. When a user (30) wishes to open a door (18) which is secured by means of an electronic locking device (12), then, at a first step (52), the user (30) opens a mobile device application resident on the mobile phone (28) and enters a personal identifier of the user (30), such as personal identification number (PIN), a password, a biometric identifier, a passphrase or an authentication image. Opening of the mobile device application initiates communication between the mobile phone (28) and the communications module (24) of the electronic locking device (12).

At a next step (54), the mobile phone (28) transmits an opening request to the communications module (24) of the electronic locking device (12) requesting to unlock the door (18). In an embodiment, the opening request includes personal identification information as well as location information of the mobile phone (28). The personal identification information may include the personal identifier entered by the user (30) as well as a mobile device identifier associated with the phone (28), such as an international mobile subscriber identity (IMSI), a mobile identification number (MIN), or a mobile subscription identification number (MSIN).

The location information comprises the geographic location of the mobile phone (28), such as latitude and longitude coordinates, and which may be determined by means of a location detection system of the mobile phone (28). The location detection system may be any one of a Global Positioning System (GPS), a Local Positioning System (LPS) or a Wireless Positioning System (WPS). It will be appreciated that where the mobile phone (28) communicates with the communications module (24) by means of NFC, the geographic location of the mobile phone (30) and the electronic locking device (16) will be substantially similar, at least while the communication takes place. In such a case, the electronic locking device (12) may be configured to determine that it will not be required for the mobile phone (28) to determine its location since it is substantially similar to the location of the electronic locking device (12).

At a next step (56), the electronic locking device (12) receives the opening request, and, at a next step (58), the communications module (24) transmits an opening request over the communications network (26) to the remotely accessible server (14). The opening request may include the unique identifier of the electronic locking device (12) as well as the personal identification information and location data of the mobile phone (28).

It is envisioned that where communication between the communications module (24) and the server (14) takes place over a wireless communications network (26), such communication will at a first route take place over a 3G, 4G or GPRS communications network (26). If such a communications network (26) is not available, then as a second route, communication will take place by means of SMS. Finally, in the event of SMS also not being available, as a final failsafe, communication will take place by means of USSD. It will be appreciated that this procedure will provide sufficient safeguards to ensure that communication between the communications module (24) and the server (14) will be possible, while at the same time ensuring that the costs of such communication be kept to a minimum.

At a next step (60), the remotely accessible server (14) receives the opening request and, at a next step (62), determines whether the mobile phone (28) and hence also the user (30) comply with certain predefined parameters in order to be permitted to open the door (18) and thus access to the cubicle (20). The determination and predefined parameters may include severable steps and may be customised for each entity making use of the system (10).

In the embodiment illustrated, the first determination performed is to determine whether the personal identification information included in the opening request corresponds with information of users and their respective mobile communications devices that are permitted to open the door. In this regard, numerous unique identifiers of electronic locking devices forming part of the system, as well as personal identification information of numerous mobile communications device and users may be stored on the system database (16).

Thus, the server (14) firstly retrieves a list of mobile device identifiers in order to determine whether the mobile device identifier received in the opening request matches a device identifier which has been registered on the system and which is thus permitted to request the electronic locking device (12) to open. If it is determined that the mobile phone (28) is permitted to request the electronic locking device (12) to open, then a second determination may be performed which may include determining whether the personal identifier entered by the user (30) matches a personal identifier associated with the mobile device identifier of the mobile phone (28). Again, if the personal identifier entered matches an identifier associated with the mobile device identifier, then a further determination may be performed, for example whether the electronic locking device (12) which has transmitted the opening request is secured to a door (18) of a cubicle (20) that is located on a route which the user (30) is supposed to service or whether any of the ATMs (22) located at the cubicle (20) are due for a service. Each time a determination has been successfully completed, the server (14) may be configured to mark at least some of the predefined parameters as having been met.

In addition, the determination may include determining whether the personal identifier of the user (30) was entered correctly. In this case, the system (10) may provide for an additional safeguard in terms of which the server (14) may be configured to transmit a security alert, such as a silent alarm, when, in the case of the personal identifier of the user (30) being a password or PIN, one or more characters thereof have been intentionally entered incorrectly. For example, if the correct PIN is 245783 and the user enters either 245782 or 245784, thus changing the last digit, then the server (14) may be configured, at a next step (64), to sound the alarm but, at a next step (66), also transmit an opening instruction to the electronic locking device (12). It will be appreciated that this additional safeguard will provide additional security to the entity making use of the system (10), while at the same time protecting the user requesting to open the electronic locking device (12) from harm, for example in case of armed robbery or the like.

The determination may further include a location verification. The server (14) may be configured to determine whether the mobile phone (28) having requested access to the cubicle (20) is located within a predefined area about the electronic locking device (12). The server (14) may compare the received location data of the mobile phone (28) with the geographic location data of the electronic locking device (12) associated with the unique identifier and stored on the system database (16). If the mobile phone (28) is located within a predefined area about the electronic locking device (12), then the server (14) may be configured to mark at least some of the predefined parameters as having been met.

Alternatively, in an embodiment, the geographic location data of the electronic locking device (12) may be hardcoded into the communications module (24) and each time the communications module (24) transmits an opening request to the server (14), it includes the geographic location data in the opening request. In such a case, the server (14) may be configured to first compare the geographic location data received in the opening request with the geographic location data stored on the system database (16) and associated with the unique identifier of the particular electronic locking device (12) and then determine whether the mobile phone (28) meets the predefined parameters.

It will of course be appreciated that the predefined parameters may be set and or modified as required, thus the area and/or range within which the mobile phone (28) must be located prior to the server (14) determining that the predefined parameter has been met may vary as required.

Once all of the determinations have been completed and the server (14) has marked all of the predefined parameters as having been met, thus that the mobile phone (28) and therefore the user (30) is permitted to open the electronic locking device (12) and access the cubicle (20), then at a next step (66), the server (14) transmits an opening instruction to the communications module (24) of the electronic locking device (12) to unlock the door (18).

At a next step (68), the communications module (24) of the electronic locking device (12) receives the opening instruction and in response thereto, opens the door (18).

Alternatively, in the event that the server (14) determines that the mobile phone (28) and user (30) are not permitted to access the cubicle (20), then at a next step (70), the server (14) transmits a notification to the communications module (24) that the electronic locking device (12) is to remain locked. It will be appreciated that in this event, the server (14) may be configured to sound an alarm so as to notify the entity making use of the system (10) that an unauthorised user (30) is attempting to enter the cubicle (20).

Furthermore, the time period for which the electronic locking device (12) remains open may also be set as required. For example, in the embodiment described above in which the door (18) closes the cubicle (20) in which ATMs (22) have been installed, the time period for which the electronic locking device (12) remains open may be set for two or three minutes. It will be appreciated that the electronic locking device (12) itself may be configured to close once the particular time period has lapsed, alternatively, the time period may form part of the predefined parameters and once the time period has lapsed, the server (14) may be configured to transmit a closing instruction to the electronic locking device (12) to close.

In addition, all communication between the communications module (24) and the server (14) may be encrypted so as to provide an additional safeguard. Encryption may be hardware encryption or software encryption, however, hardware encryption is preferred due to its higher security levels. In this regard, it will be appreciated that further character strings may be hardcoded into the communications module (24), which may then be used for encryption purposes. For example, each communication module may include an additional string of characters to identify the entity making use of the system, such as the name of the financial institution. The additional string may then be used to encrypt communications in such a way so that in the event that a cubicle provides for ATMs belonging to more than one financial institution, only employees of the particular financial institution will be able to access the ATMs that belong to the financial institution.

It will of course also be appreciated that the server may be configured to, in response to receiving an opening request, transmit the request to an electronic communications device for approval of the request. For example, in the event that the request is to open the electronic locking device which secures the door of a bank's vault, one of the predefined parameters may be that the bank manager, central control centre or the like approves the request. In such a case, the server may transmit the request to the electronic communications device of the bank manager and only once the bank manager has approved the opening will the server transmit the opening instruction to the electronic communications device.

Figure 3:
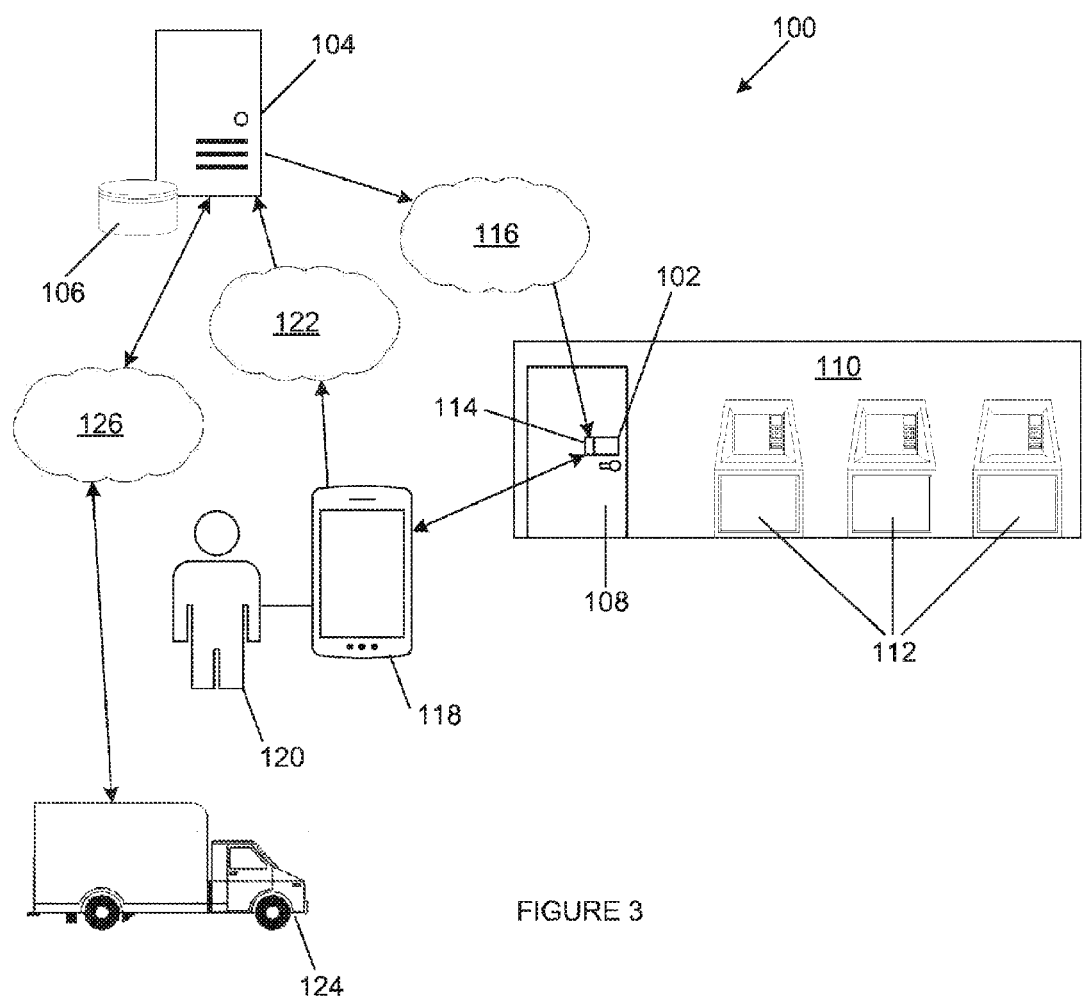
FIG. 3 illustrates a system for enabling opening of an electronic locking device from a remote location according to a further embodiment.

FIG. 3 illustrates an embodiment of a system (100) for enabling opening of an electronic locking device (102) from a remote location. The system (100) is similar to the system (10) illustrated in FIG. 1 and again includes a remotely accessible server (104) in data communication with a system database (106) and a plurality of electronic locking devices (102) each of which secures an closing member (108). Again only one electronic locking device (102) is illustrated which secures a door (108) of an entrance to a cubicle (110) in which a number of ATMs (112) have been installed.

Each electronic locking device (102) again has a unique identifier associated therewith and which is stored on the system database (106). The unique identifier comprises a string of characters assigned to the electronic locking device (102) and geographic location data of the door (108) to which the device (102) has been secured.

The electronic locking device (102) further includes a communications module (114) to enable it to communicate with the remotely accessible server (14) over a communications network (116).

The system further includes a mobile communications device (118) of a user (120) who intends to open the door (108). The mobile communications device (118) illustrated is again a mobile phone, but any suitable mobile communications device capable of wireless communication may be used. The mobile phone (118) is capable of communicating with the electronic locking device (102) as well as with the server (104). Communication between the mobile phone (118) and the server (104) takes place over a communications network (122) which may include 3G, 4G, HSDPA or the like, while communications between the mobile phone (118) and the communications module (114) of the electronic locking device (102) may take place over a local wireless network, near-field communication (NFC), Bluetooth, infrared, but may also be over 3G, 4G, HSDPA or the like.

In addition, the system (100) includes a secondary verification device (124), in this embodiment a vehicle which may be driven by the user (120). The server (104) is capable of communicating with the vehicle (124) over a communications network (126) which may include 3G, 4G, HSDPA or the like as will be described in more detail further below.

Figure 4:
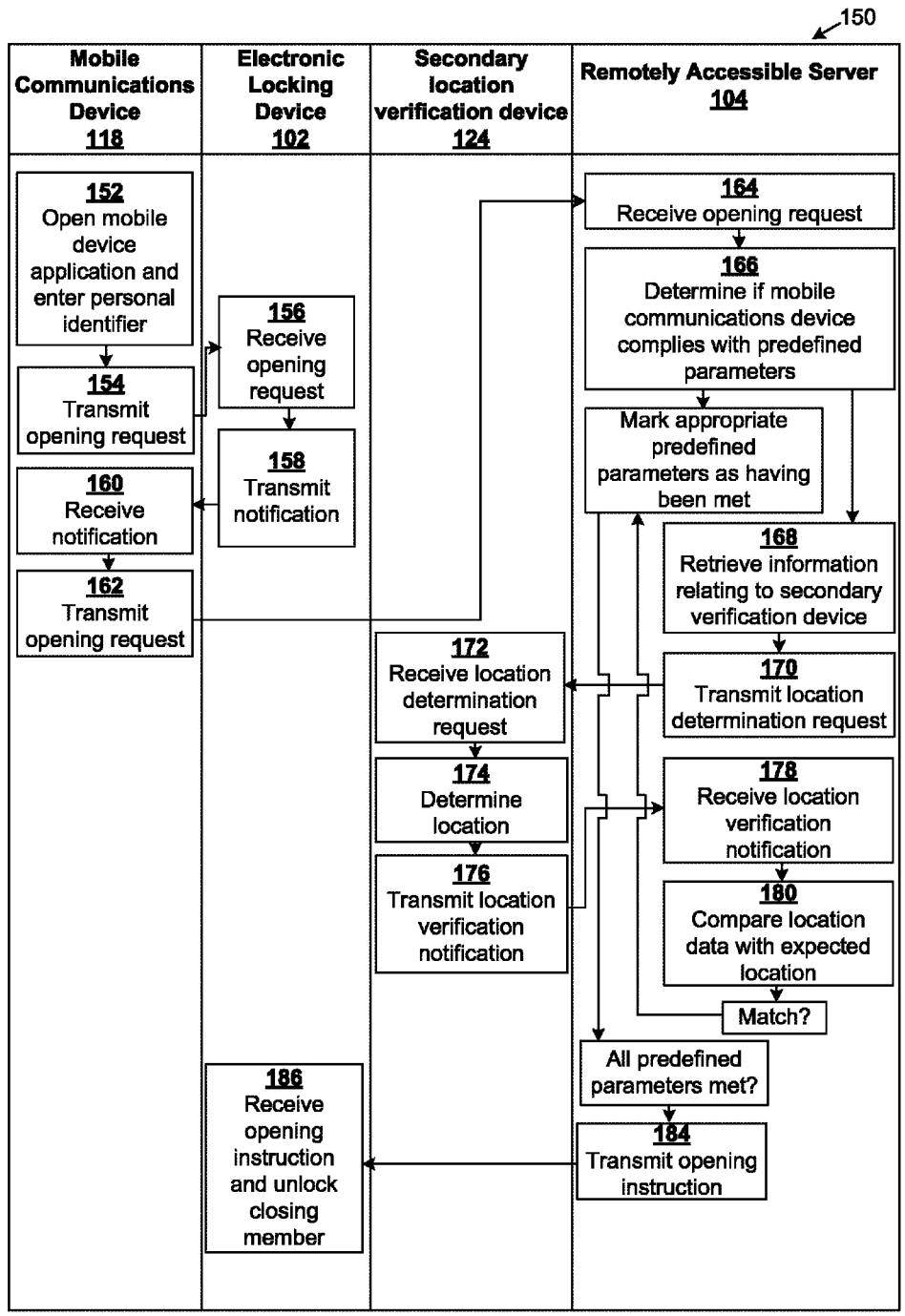
FIG. 4 is a swim-lane flow diagram illustrating a method for opening an electronic locking device from a remote location using the system of FIG. 3.

The system (100) of FIG. 3 may be used according to the method described and illustrated in the embodiment of the swim lane diagram (150) of FIG. 4.

Referring to FIG. 4, an embodiment of a method for opening an electronic locking device (102) from a remote location is described. When a user (120) wishes to open a door (108) which is secured by means of an electronic locking device (102), then, at a first step (152), the user (120) opens a mobile device application resident on the mobile phone (118) and enters a personal identifier of the user (120), such as personal identification number (PIN), a password, a biometric identifier, a passphrase or an authentication image. Opening of the mobile device application initiates communication between the mobile phone (118) and the communications module (114) of the electronic locking device (102).

In addition or alternatively, the mobile device application may require the user (120) to enter a particular sequence of buttons or movements in order to identify him/herself. In the case of a sequence of movements, the mobile phone (118) may require the user (120) to draw a specific pattern on its touch sensitive display, or press down with one or two fingers on specific locations on the display. The mobile device application may use such a sequence of buttons to permit the user (120) to access the application, or it may be used to confirm to the server (104) that it is in fact the authorised user (104) using the mobile phone (118). For example, once the user (120) has entered his/her personal identifier, the mobile device application may require the user (120) to press down on the display at specific locations, such as the top right and bottom right corner, for about 3 seconds. If this is not done, the mobile phone (118) may still be used to transmit an opening request to the server (104), as will be described further below, but the mobile phone (118) could in the meantime transmit an alert notification to the server (104), or the server (104) may be configured to determine, that the user (120) is in danger and not in control of the mobile phone (118) or the like. In such a case, the server (104) may be configured to sound an alarm while still permitting the door (108) to be opened. It will of course be appreciated that the specific locations on which the user needs to press down will not be visible or marked so as to ensure that only authorised user may know where to press.

At a next step (154), the mobile phone (118) transmits an opening request to the communications module (114) of the electronic locking device (102) requesting to unlock the door (108). At a next step (156), the communications module (114) receives the opening request, and in response thereto, at a next step (158), transmits a notification to the mobile phone (118) which includes the unique identifier of the electronic locking device (102).

At a next step (160), the mobile phone (118) receives the notification from the electronic locking device (102) and, at a next step (162), transmits an opening request to the server (104). The opening request includes the personal identification information, thus the mobile device identifier of the mobile phone (118) as well as the personal identifier of the user (120), the unique identifier of the electronic locking device (102), as well as location information of the mobile phone (118). It will of course be appreciated that instead of the mobile phone (118) first transmitting an opening request to the electronic locking device and then receiving a notification with the unique identifier of the electronic locking device, the unique identifier could also be visible to the user and the user could then simply enter the unique identifier on the mobile phone. The mobile phone would then in the same way transmit an opening request to the server.

Again and as described with reference to FIG. 2, the unique identifier of the electronic locking device (102) may include the geographic location data of the electronic locking device (102) which has been hardcoded into the communications module (114).

At a next step (164), the remotely accessible server (104) receives the opening request and, at a next step (166), determines whether the mobile phone (118) and hence also the user (120) comply with certain predefined parameters in order to be permitted to open the door (108) and thus access the cubicle (110). As detailed above, the determination may include several steps and may be customised for each entity making use of the system (100). Each time it is determined that a predefined parameter has been met, the server (104) may mark at least some of the predefined parameters to that effect. To avoid duplication, the various determinations that may be performed are not repeated.

In addition to the location verification of the mobile phone (118) as described with reference to FIG. 2, the server (104) may be configured to perform secondary location verification. Once the server (104) receives the opening request from the mobile phone (118) then, at a next step (168), it retrieves information relating to a secondary verification device associated with the mobile phone (118) from the system database (106). In this embodiment the secondary verification device (124) is the vehicle (124) of the user (120) and the server (104) is configured to communicate with the vehicle (124) over a communications network (126) such as 3G, 4G or the like.

At a next step (170), the server (104) transmits a location determination request to the vehicle (124) to prompt the vehicle (124) to determine its location. In order to determine its location, the vehicle may be fitted with a location detection system such as GPS or the like.

At a next step (172), the vehicle receives the location determination request, determines, at a next step (174), its location and, at a next step (176) transmits a location verification notification to the server (104).

At a next step (178), the server (104) receives a location verification notification from the vehicle (124) which includes location data of the vehicle (124). Then, at a next step (180), the server (104) compares the location data received from the vehicle (124) to an expected location. The expected location may include a fixed designated location, such as a demarcated parking location for the vehicle (124) in close proximity to the cubicle (120), a particular street address, a particular location in close proximity to the electronic locking device (102), the location of the mobile phone (118) or the like. If the location data received from the vehicle (124) matches the expected location then, at a next step (182), the server (104) marks at least some of the predefined parameters as having been met.

Once all of the determinations have been completed and the server (104) has marked all of the predefined parameters as having been met, then at a next step (184), the server (104) transmits an opening instruction to the communications module (114) of the electronic locking device (102) to unlock the door (108).

At a next step (186), the communications module (114) of the electronic locking device (102) receives the opening instruction and in response thereto, opens the door (108).

It will be appreciated that the secondary location verification performed by the server may provide an additional safeguard to the system since a user will then only be able to open the electronic locking device where in fact the user has arrived with the designated vehicle. This may be particularly relevant where for example the mobile communications device and the personal identification information of the user have been lost or stolen. In such a case, the server would determine that although the user and the mobile communications device are permitted to open the closing member, the secondary verification device, for example the vehicle of the user, are not at the expected location and hence the server may be configured to not transmit the opening instruction.

Furthermore, it will be appreciated that features described and illustrated with reference to FIGS. 1 and 2 may of course similarly be employed in the system and method described and illustrated with reference to FIGS. 3 and 4. Thus, the additional safeguard of the secondary verification device or the requirement of the user holding down on specific locations of the mobile phone's touch screen may be similarly employed in the embodiment illustrated and described in FIGS. 1 and 2 and are not limited to the embodiment illustrated in FIGS. 3 and 4.

Although the descriptions above are specific to systems in which the electronic locking devices secure a door to a cubicle, and it will be appreciated that many other embodiments of an electronic door locking system exist which fall within the scope of the invention. For example, the electronic locking device could be secured to any form of closing member, such as a door of a premises, the door of a vehicle, a closure for a container or the like.

When secured to a non-stationary object, the determinations performed by the server are similar to those described with reference to FIGS. 1 to 4, provided that the geographic location of the electronic locking device is not fixed. In such a case, the electronic locking device may include a location detection system so as to detect its geographic location and then transmit such data to the server. Of course, even electronic locking devices secured to stationary objects, such as a premises, may be enabled to determine their own location. In such a case, when determining whether the mobile phone is in close proximity to the electronic locking device, the server may transmit location information requests to both the mobile phone and the electronic locking device to determine their respective locations. For example, the electronic locking device may be secured to the door of a valuable goods transported. In such a case, the server will only transmit the opening instruction if the mobile device of, for example the driver, has requested the electronic locking device to open and if the device is in close proximity to the door. In addition, by making use of secondary location verification, the server may then request the location of the transporter and only permit the electronic locking device to be opened if the transporter is at an expected location, such as a designated parking spot at a bank or the like.

Furthermore, the secondary location verification may further be employed where, for example, goods or parcels are delivered by means of a vehicle and in which each of the goods or parcels are kept in a particular locker or the like. In such a case, the server may be configured to transmit an opening instruction to each of the electronic locking devices secured to the doors of the individual lockers only once the vehicle has arrived at the particular delivery location. This may of course also apply in other situations, for example where the electronic locking devices is used to secure a fuel tank cap of a vehicle. In such a case, the server may be configured to determine the vehicle's location and to only transmit an opening instruction if the vehicle is located at the premises of a fuel station. Alternatively, only location verification of the mobile communications device is performed and the server will then only transmit an opening instruction to the mobile communications device if in close proximity of the fuel tank cap.

Also, instead of being capable to communicate with the server directly, the electronic locking device may be configured to utilise the communication capabilities of the mobile communications device to communicate with the server. For example, in the event that the electronic locking device communicates with the mobile communications device by means of NFC, a local wireless network or the like, the electronic locking device may be configured to transmit an opening request to the mobile communications device which in turn then transmits the request to the server. Once the server has determined that the mobile communications device is permitted to open the electronic locking device, it transmits the opening instruction to the mobile communications device which then transmits the opening instruction to the electronic locking device. It will be appreciated that although this system may not be as secure as the systems described above, the manufacturing and implementation costs of the system are substantially lower than those where the electronic locking device is capable of communicating directly with the server.

Furthermore, where the electronic locking device has been secured internally of a door, such as described with reference to FIGS. 1 and 3, an electronic solution such as an access card reader, personal identification number (PIN) entry device or a fingerprint reader could be secured to a surface of the door internally of the cubicle. This would enable the user to open the door, once inside the cubicle, without the need to transmit an opening request to the electronic locking device.

In addition, an electronic locking device may also be secured to each ATM installed at a cubicle, and the server configured to prohibit an ATM to be accessed while the door to the cubicle or another ATM is open. Similarly, instead of sounding an alarm, or in combination with the alarm, the server could be configured to activate a closed circuit television (CCTV) system within the cubicle. The server could of course also be configured to activate the CCTV system as soon as it transmits the opening instruction to the communications module.

Figure 5:
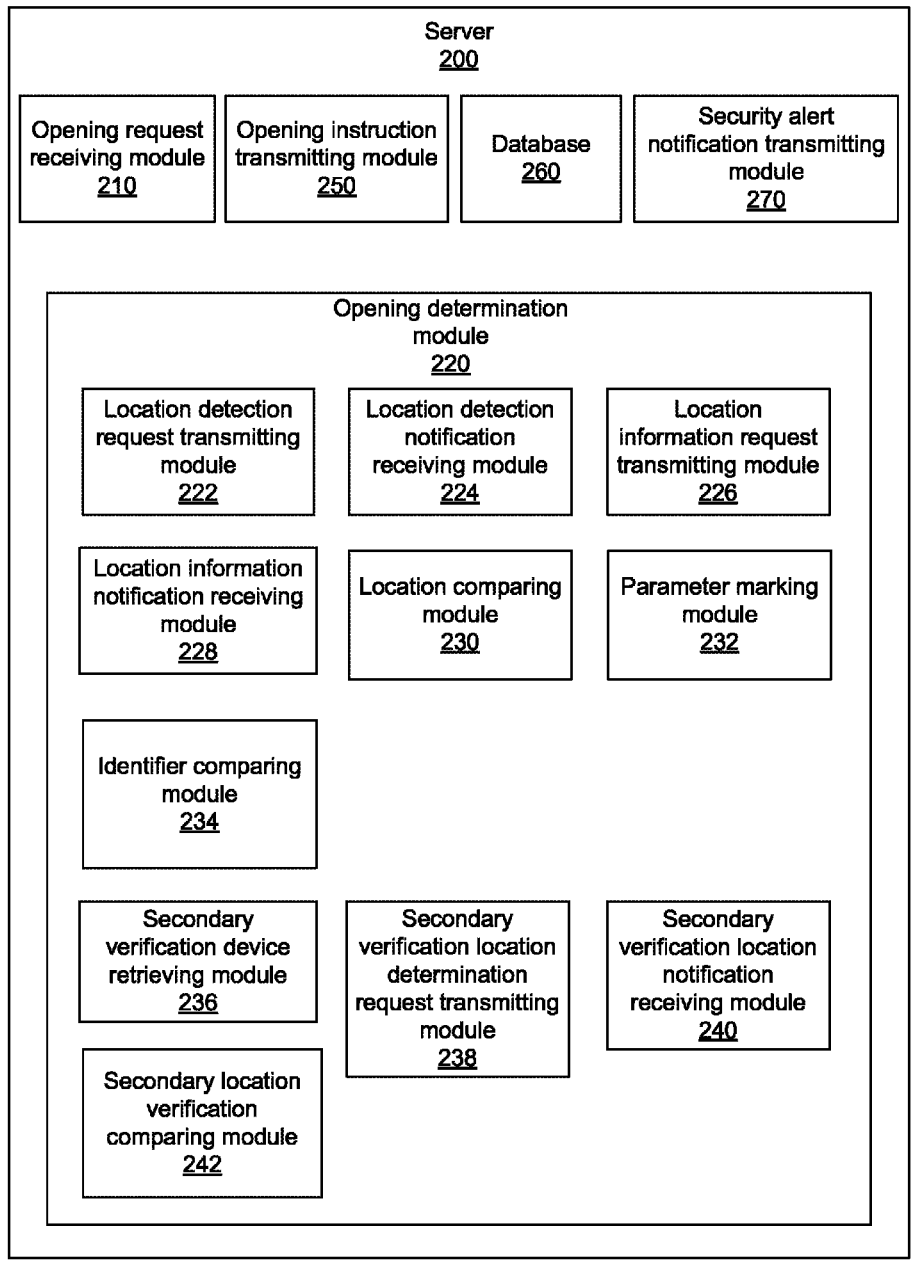
FIG. 5 is a block diagram which illustrates an example of a remotely accessible server.

FIG. 5 illustrates an example of a remotely accessible server (200) as used in the described system. The server (200) may include a processor for executing the functions of the described modules which may be software units executing on the processor.

The server (200) includes an opening request receiving module (210), an opening determination module (220), an opening instruction transmitting module (250) and a database (260). In the embodiment illustrated in FIG. 5, the database (260) is a local database of the server (200), but it may of course also be a database remote of the server (200) which is in data communications with the server (200). In addition and as illustrated in FIG. 5, the server (200) may further include a security alert notification transmitting module (270).

The opening request receiving module (210) may be used to receive opening requests, either from electronic locking devices or from mobile communications devices. For example, in the embodiment described with reference to FIG. 1, the opening request receiving module (210) is used to receive an opening request from the electronic locking device. On the other hand, in the embodiment described with reference to FIG. 3, the opening request receiving module (210) is used to receive an opening request from mobile phone. The opening request may include a unique identifier of the electronic locking device which may comprise a string of characters assigned to the electronic locking device and geographical location data of a closing member to which the device has been secured. The opening request may further include personal identification information of the mobile communications device which may include a mobile device identifier associated with the mobile communications device as well as a personal identifier of the user of the device. In addition, the opening request may include location information of the mobile communications device.

The opening determination module (220) may be used to determine whether the mobile communications device requesting to open the electronic locking device is in fact permitted to open the electronic locking device. As described with reference to FIGS. 1 and 3, the determination may include a number of steps and in order to perform these steps, the server (200) may optionally include a number of further modules.

The server (200) may include a location detection request transmitting module (222), which may be used to transmit a location detection request to the electronic locking device so as to prompt the electronic locking device to determine its geographical location. It will be appreciated that this will only be required where the opening request does not include the geographical location of the electronic locking device.

In this regard, the server (200) may further include a location detection notification receiving module (224), which may be used to receive a location detection notification from the electronic locking device. The location detection notification includes the geographical location data of the electronic locking device and may be received in response to transmitting the location detection request to the electronic locking device.

Similarly, the server (200) may include a location information request transmitting module (226), which may be used to transmit a location information request to the mobile communications device so as to prompt the mobile communications device to determine its location. Again, it will be appreciated that this will only be required where the opening request does not include the location information of the mobile communications device.

In this regard, the server (200) may further include a location information notification receiving module (228), which may be used to receive a location information notification from the mobile communications device. The location information notification includes the location information of the mobile communications device and may be received in response to transmitting the location information request to the mobile communications device.

Once the server (200) has both the geographic location data of the electronic locking device and the location information of the mobile communications device, the server (200) may be configured to compare the locations. In this regard, the server (200) may include a location comparing module (230), which may be used to compare the geographic location of the electronic locking device with the location information of the mobile communications device. As described above, the server (200) performs one or more determinations in order to determine whether the mobile communications device complies with certain predefined parameters and is therefore permitted to open the electronic locking device. One of these predefined parameters may include that the mobile communications device is within a predefined area or range from the electronic locking device.

The server (200) may further include a parameter marking module (232), which may be used to mark at least some of the predefined parameters as having been met. Thus, if the location comparing module determines that the mobile communications device is located within the predefined area or range, then the parameter marking module (232) may be used to mark at least the predefined parameters relating to determination as having been met.

In addition, the server (200) may further include an identifier comparing module (234). As described above, the opening request may include a unique identifier of the electronic locking device as well as personal identification information of the mobile communications device. A plurality of unique identifiers associated with electronic locking devices, a plurality of mobile device identifiers as well as a plurality of personal identifiers may be stored on the database (260) and thus retrievable by the server (200). The server (200) may be configured to perform various determinations in this regard, for example, the identifier comparing module (234) may be used to determine whether the received mobile device identifier is in fact permitted to request the electronic locking device with the particular unique identifier to open. A further determination may be whether the personal identifier entered by the user matches with a personal identifier associated with the mobile device identifier.

Once any one of the determinations has been successfully completed, in other words, once the identifier comparing module (234) has determined that the applicable information matches, then the parameter marking module (232) may be used to mark the applicable predefined parameter as having been met.

In addition, in order to provide additional security, the server (200) may be configured to perform secondary location verification. In this regard, the server (200) may include a secondary verification device retrieving module (236), which may be used to retrieve information relating to a secondary verification device from the database (260). As described with reference to FIG. 3, the secondary verification device may be a vehicle or the like which is driven by the user. The information relating to the secondary verification device may be associated with the mobile device identifier of the mobile communications device requesting to open the electronic locking device and stored on the database (260).

Further, the server (200) may include a secondary verification location determination request transmitting module (238), which may be used to transmit a location determination request to the secondary verification device so as to prompt the device to determine its location. In this regard and as described with reference to FIG. 3, the secondary verification device may include a location detection system, such as GPS or the like, in order to enable the device to determine its location.

In addition, the server (200) may include a secondary verification location notification receiving module (240), which may be used to receive a location verification notification from the secondary verification device. The notification may include the location data, for example geographical coordinates, of the secondary verification device.

Furthermore, the server (200) may include a secondary location verification comparing module (242), which may be used to compare the location data of the secondary verification device with an expected location. As described with reference to FIG. 3, the expected location may include a fixed designated location, a street address, a location in close proximity to the geographic location of the electronic locking device, the location of the mobile communications device or the like. It will be appreciated that the secondary location verification may be another predefined parameter which must be complied with prior to the server (200) determining that the mobile communications device is permitted to open the electronic locking device.

Thus, similarly as described above, once the determination has been successfully completed, in other words the secondary location verification comparing module (242) has determined that the location data of the secondary verification device falls within a predefined range or matches the expected location, then the parameter marking module (232) may be used to mark the applicable predefined parameter as having been met.

Once all of the predefined parameters have been marked by the parameter marking module (232) as having been met, then the determination by the opening determination module (220) will have been completed.

In this regard, the server (200) further includes an opening instruction transmitting module (250), which may be used to transmit an opening instruction to the electronic locking device once the opening determination module (220) has determined that all of the predefined parameters have been met. It will be appreciated that the opening instruction transmitting module (250) may be configured to transmit the opening instruction directly to the electronic communications device, or, and as described above, it may transmit the opening instruction to the mobile communications device which then in turn transmits the opening instruction to the electronic locking device.

In addition, the server may also include a security alert notification transmitting module (270). This module (270) may be used to transmit a security alert notification to one or more electronic devices in the event that, for example, the identifier comparing module (234) determines that the personal identifier entered by the user of the mobile communications device is incorrect, thus either indicating that an unauthorised user is attempting to open the electronic locking device. Alternatively and as described above, if, for example, one of the digits of the user's PIN are intentionally entered incorrectly, the server (200) may determine that the user may be in danger and thus transmit an opening instruction to the electronic locking device, but then still transmit a security alert via the security alert notification transmitting module (270).

Figure 6:
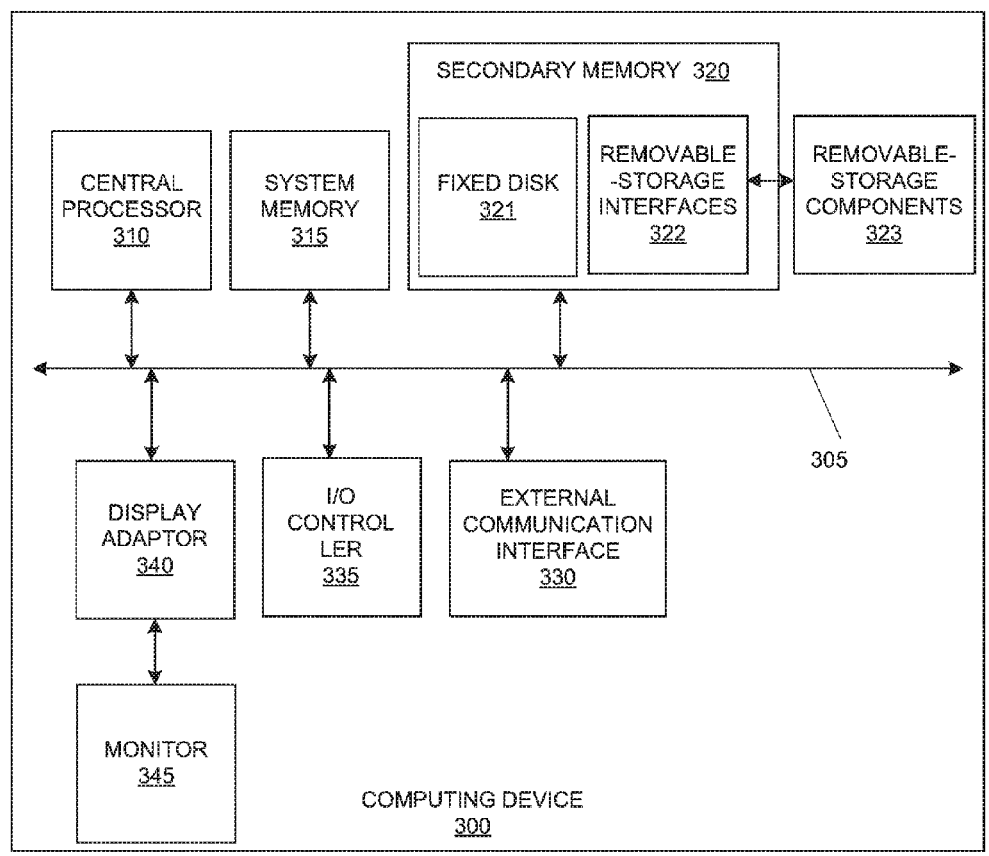
FIG. 6 illustrates an example of a computing device in which various aspects of the disclosure may be implemented.

FIG. 6 illustrates an example of a computing device (300) in which various aspects of the disclosure may be implemented. The computing device (300) may be suitable for storing and executing computer program code. The various participants and elements in the previously described system diagrams may use any suitable number of subsystems or components of the computing device (300) to facilitate the functions described herein.

The computing device (300) may include subsystems or components interconnected via a communication infrastructure (305) (for example, a communications bus, a cross-over bar device, or a network). The computing device (300) may include at least one central processor (310) and at least one memory component in the form of computer-readable media.

The memory components may include system memory (315), which may include read only memory (ROM) and random access memory (RAM). A basic input/output system (BIOS) may be stored in ROM. System software may be stored in the system memory (315) including operating system software.

The memory components may also include secondary memory (320). The secondary memory (320) may include a fixed disk (321), such as a hard disk drive, and, optionally, one or more removable-storage interfaces (322) for removable-storage components (323).

The removable-storage interfaces (322) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive.

The removable-storage interfaces (322) may also be in the form of ports or sockets for interfacing with other forms of removable-storage components (323) such as a flash memory drive, external hard drive, or removable memory chip, etc.

The computing device (300) may include an external communications interface (330) for operation of the computing device (300) in a networked environment enabling transfer of data between multiple computing devices (300). Data transferred via the external communications interface (330) may be in the form of signals, which may be electronic, electromagnetic, optical, radio, or other types of signal.

The external communications interface (330) may enable communication of data between the computing device (300) and other computing devices including servers and external storage facilities. Web services may be accessible by the computing device (300) via the communications interface (330).

The external communications interface (330) may also enable other forms of communication to and from the computing device (300) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (310).

A computer program product may be provided by a non-transient computer-readable medium, or may be provided via a signal or other transient means via the communications interface (330).

Interconnection via the communication infrastructure (305) allows a central processor (310) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (300) either directly or via an I/O controller (335). These components may be connected to the computing device (300) by any number of means known in the art, such as a serial port.

One or more monitors (345) may be coupled via a display or video adapter (340) to the computing device (300).

Figure 7:
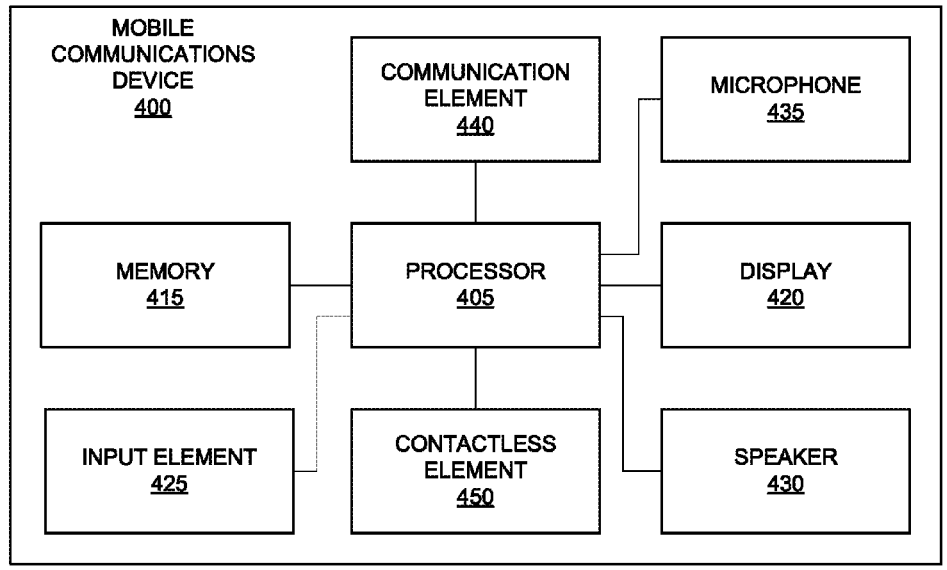
FIG. 7 shows a block diagram of a mobile communications device that may be used in embodiments of the disclosure.

FIG. 7 shows a block diagram of a mobile communications device (400) that may be used in embodiments of the disclosure. The communications device (400) may be a cell phone, a feature phone, a smart phone, a satellite phone, or a computing device having a phone capability.

The communications device (400) may include a processor (405) (e.g., a microprocessor) for processing the functions of the communications device (400) and a display (420) to allow a user to see the phone numbers and other information and messages. The communications device (400) may further include an input element (425) to allow a user to input information into the device (e.g., input buttons, touch screen, etc.), a speaker (430) to allow the user to hear voice communication, music, etc., and a microphone (435) to allow the user to transmit his or her voice through the communication device (400).

The processor (410) of the communications device (400) may connect to a memory (415). The memory (415) may be in the form of a computer-readable medium that stores data and, optionally, computer-executable instructions.

The communications device (400) may also include a communication element (1140) for connection to communication channels (e.g., a cellular telephone network, data transmission network, W-Fi network, satellite-phone network, Internet network, Satellite Internet Network, etc.). The communication element (440) may include an associated wireless transfer element, such as an antenna.

The communication element (440) may include a subscriber identity module (SIM) in the form of an integrated circuit that stores an international mobile subscriber identity and the related key used to identify and authenticate a subscriber using the communications device (400). One or more subscriber identity modules may be removable from the communications device (400) or embedded in the communication device (400).

The communications device (400) may further include a contactless element (450), which is typically implemented in the form of a semiconductor chip (or other data storage element) with an associated wireless transfer element, such as an antenna. The contactless element (450) may be associated with (e.g., embedded within) the communications device (400) and data or control instructions transmitted via a cellular network may be applied to the contactless element (450) by means of a contactless element interface (not shown). The contactless element interface may function to permit the exchange of data and/or control instructions between mobile device circuitry (and hence the cellular network) and the contactless element (450).

The contactless element (450) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communications device (400) and an interrogation device.

Thus, the communications device (400) may be capable of communicating and transferring data and/or control instructions via both a cellular network and near field communications capability.

The data stored in the memory (415) may include: operation data relating to the operation of the communications device (400), personal data (e.g., name, date of birth, identification number, etc.), etc. A user may transmit this data from the communications device (400) to selected receivers.

The communications device (400) may be, amongst other things, a notification device that can receive alert messages and access reports, as well as a portable consumer device.

Figure 8:
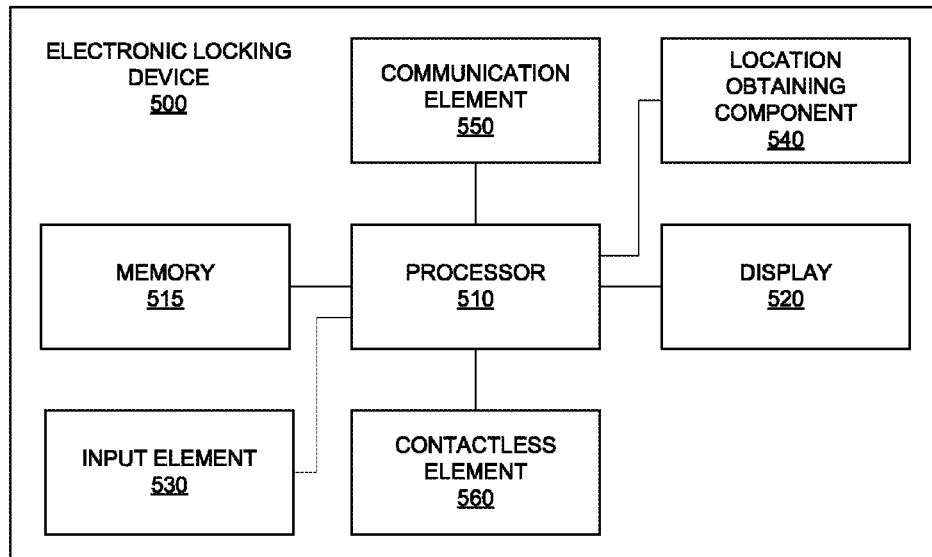
FIG. 8 shows a block diagram of an electronic locking device that may be used in embodiments of the disclosure.

FIG. 8 shows a block diagram of an electronic locking device (500) that may be used in embodiments of the disclosure. The electronic locking device (500) may include a processor (510) (e.g., a microprocessor) for processing the functions of the electronic locking device (500) and, optionally, a display (520) to allow a user to see information processed by the device or other messages. The electronic locking device (500) may further include an input element (530) to allow a user to input information into the device (e.g., input buttons, touch screen, etc.), a location obtaining component (540), such as a global positioning system (GPS), to enable the device to determine its geographic location.

The processor (510) of the electronic locking device (500) may connect to a memory (515). The memory (515) may be in the form of a computer-readable medium that stores data and, optionally, computer-executable instructions.

The electronic locking device (500) may also include a communication element (550) for connection to communication channels (e.g., a cellular telephone network, data transmission network, Wi-Fi network, satellite-phone network, Internet network, Satellite Internet Network, etc.). The communication element (550) may include an associated wireless transfer element, such as an antenna.

The communication element (550) may include a subscriber identity module (SIM) in the form of an integrated circuit that stores an international mobile subscriber identity and the related key used to identify and authenticate a subscriber using the electronic locking device (500). One or more subscriber identity modules may be removable from the electronic locking device (500) or embedded in therein.

The electronic locking device (500) may further include a contactless element (560), which is typically implemented in the form of a semiconductor chip (or other data storage element) with an associated wireless transfer element, such as an antenna. The contactless element (560) may be associated with (e.g., embedded within) the electronic locking device (500) and data or control instructions transmitted via a cellular network may be applied to the contactless element (560) by means of a contactless element interface (not shown). The contactless element interface may function to permit the exchange of data and/or control instructions between mobile device circuitry (and hence the cellular network) and the contactless element (560).

The contactless element (560) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID, ISO/IEC 18000), BLUETOOTH (IEEE 802.15.1) (The foregoing standards are incorporated herein in their entireties by this reference thereto), infra-red, or other data transfer capability that can be used to exchange data between the electronic locking device (500) and an interrogation device. Thus, the electronic locking device (500) may be capable of communicating and transferring data and/or control instructions via both a cellular network and a near field communications capability.

The data stored in the memory (515) may include operation data relating to the operation of the electronic locking device (500). This data may be transmit from the electronic locking device (500) to selected receivers.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for enabling opening of an electronic locking device from a remote location, the method being carried out at a remotely accessible server and including:
   receiving, from a mobile communications device, an opening request to open an electronic locking device which secures a closing member, the opening request including a unique identifier of the electronic locking device and personal identification information of the mobile communications device;
   receiving location information of the mobile communications device;
   determining, based on predefined parameters, whether the mobile communications device is permitted to open the electronic locking device, including:
   obtaining a stored geographical location of the electronic locking device, including receiving from the electronic locking device a location detection notification which includes a geographic location of the electronic locking device having been permanently stored therein; and,
   determining a proximity range of the location information of the mobile communications device to the geographical location of the electronic locking device;
   and
   in response to determining that the mobile communications device is permitted to open the electronic locking device, transmitting an opening instruction to the electronic locking device via a communication network to unlock the closing member.

2. The method as claimed in claim 1, wherein the location information of the mobile communications device is included in the opening request or is received in a location detection notification in response to the remotely accessible server transmitting a location detection request.

3. The method as claimed in claim 1, wherein obtaining the stored geographical location of the electronic locking device includes retrieving the stored geographical location referenced by the unique identifier of the electronic locking device from a system database.

4. The method as claimed in claim 1, including requesting the geographical location of the electronic locking device, including:
   transmitting a location detection request to the electronic locking device prompting the electronic locking device to provide its geographic location.

5. The method as claimed in claim 1, wherein the method includes, in response to receiving the opening request:

transmitting a location information request to the mobile communications device prompting the mobile communications device to determine its location; and receiving a location information notification from the mobile communications device which includes the location information of the mobile communications device.

6. The method as claimed in claim 1, wherein the remotely accessible server is configured to perform secondary location verification and for the step of determining, based on predefined parameters, whether the mobile communications device is permitted to open the electronic locking device includes the steps of:

retrieving information relating to a secondary verification device from a system database;

receiving a location verification notification from the secondary verification device which includes location data of the secondary verification device; and wherein the predefined parameters include a proximity range of the location data of the secondary verification device to an expected location.

7. The method as claimed in claim 6, wherein the remotely accessible server is configured to, in response to retrieving information relating to the secondary verification device, transmit a location determination request to the secondary verification device prompting the secondary verification device to determine its location.

8. The method as claimed in claim 6, wherein the expected location is one or more of: a fixed designated location, a street address, a location in close proximity to the geographic location of the electronic locking device, or the location of the mobile communications device.

9. The method as claimed in claim 1, wherein the personal identification information includes a mobile device identifier associated with the mobile communications device and a personal identifier of the user of the mobile communications device.

10. The method as claimed in claim 9, wherein the personal identifier includes a confirmation that a particular sequence of buttons or movements have been entered on the mobile communications device.

11. The method as claimed in claim 10, wherein specific locations on which the user is required to press down to enter the particular sequence of movements required for confirmation are not visible or marked on the mobile communications device.

12. The method as claimed in claim 9, wherein a plurality of mobile device identifiers and a plurality of personal identifiers are stored on a system database and wherein the predefined parameters include an identifier match of the received personal identification information and the stored mobile identifiers and the stored personal identifiers.

13. The method as claimed in claim 12, including transmitting, in the event that the received personal identification information does not match the stored mobile identifiers and stored personal identifiers, a security alert notification to one or more electronic devices that an unauthorised mobile communications device is requesting to open the electronic locking device.

14. The method as claimed in claim 1, wherein the geographic location of the electronic locking device is permanently stored by hardcoding the geographical location in the electronic locking device.

15. The method as claimed in claim 14, wherein determining whether the mobile communications device is permitted to open the electronic locking device includes comparing the hardcoded geographic location with geographic location data stored on a system database and associated with the unique identifier of the electronic locking device and then determining whether the mobile communication device is permitted to open the electronic locking device.

16. An electronic door locking system comprising a remotely accessible server including:

an opening request receiving module for receiving, from a mobile communications device, an opening request to open an electronic locking device which secures a closing member, the opening request including a unique identifier of the electronic locking device and personal identification information of the mobile communications device;

a location information receiving module for receiving location information of the mobile communications device;

an opening determination module for determining, based on predefined parameters, whether the mobile communications device is permitted to open the electronic locking device including: obtaining a stored geographical location of the electronic locking device including receiving from the electronic locking device, via a location detection notification receiving module, a location detection notification which includes a geographic location of the electronic locking device having been permanently stored therein; and, determining a proximity range of the location information of the mobile communications device and the geographical location of the electronic locking device; and an opening instruction transmitting module for transmitting an opening instruction to the electronic locking device via a communications network to unlock the closing member in response to determining that the mobile communications device is permitted to open the electronic locking device.

17. The system as claimed in claim 16, in which the system includes one or more electronic locking devices each of which secures a closing member and is capable of communicating with the remotely accessible server over the communications network.

18. The system as claimed in claim 16, wherein the remotely accessible server is configured to perform location verification and includes a location comparing module for comparing the location information of the mobile communications device with the permanently stored geographical location of the electronic locking device and, wherein the predefined parameters include a proximity range of the location information of the mobile communications device and the geographical location of the electronic locking device.

19. The system as claimed in claim 18, wherein the remotely accessible server includes a location detection request transmitting module and receives the location information of the mobile communications device in a location detection notification in response to transmitting a location detection request to the mobile communications device.

20. The system as claimed in claim 18, wherein the remotely accessible server includes a geographical location retrieving module for retrieving a geographical location referenced by the unique identifier of the electronic locking device from a system database.

21. The system as claimed in claim 16, wherein the remotely accessible server includes a location detection request transmitting module for transmitting a location detection request to the electronic locking device prompting the electronic locking device to provide its geographic location.

22. The system as claimed in claim 19, wherein the remotely accessible server includes a location information notification receiving module for receiving a location information notification from the mobile communications device which includes the location information of the mobile communications device.

23. The system as claimed in claim 16, wherein the remotely accessible server is configured to perform secondary location verification and includes a secondary verification device retrieving module for retrieving information relating to a secondary verification device from a system database, a secondary verification location notification receiving module for receiving a location verification notification from the secondary verification device which includes the location data of the secondary verification device, a secondary location verification comparing module for comparing the location data of the secondary verification device to an expected location, and for the remotely accessible server to be configured to mark, by means of the parameter marking module, at least some of the predefined parameters as having been met, if the location data matches the expected location.

24. A system as claimed in claim 16, wherein the personal identification information includes a mobile device identifier and a personal identifier of the user and wherein a plurality of mobile device identifiers and a plurality of personal identifiers are stored on a system database, wherein the remotely accessible server further includes an identifier comparing module for comparing the received personal identification information with the plurality of mobile identifiers and the plurality of personal identifiers stored on the system database and, wherein the predefined parameters include an identifier match of the received personal identification information and the stored mobile identifiers and the stored personal identifiers.

25. The system as claimed in claim 16, wherein the geographic location of the electronic locking device is permanently stored by hardcoding the geographical location in the electronic locking device.

* * * * *